United States Patent [19]
Emma et al.

[11] Patent Number: 5,233,702
[45] Date of Patent: Aug. 3, 1993

[54] CACHE MISS FACILITY WITH STORED SEQUENCES FOR DATA FETCHING

[75] Inventors: Philip G. Emma, Danbury, Conn.; Joshua W. Knight, Mohegan Lake; James H. Pomerene, Chappaqua, both of N.Y.; Thomas R. Puzak, Ridgefield, Conn.; Rudolph N. Rechtschaffen, Scarsdale, N.Y.

[73] Assignee: International Business Machines Corporation, Armonk, N.Y.

[21] Appl. No.: 390,587

[22] Filed: Aug. 7, 1989

[51] Int. Cl.⁵ .................. G06F 9/32; G06F 12/00; G06F 12/02; G06F 13/00
[52] U.S. Cl. .................. 395/425; 395/400; 364/243.11; 364/251; 364/251.7; 364/148; 364/160; 364/960.7; 364/964.2; 364/165.8
[58] Field of Search ............ 364/200 MS, 900 MS, 364/948, 955.6, 957.9, 957.5; 395/425

[56] References Cited

U.S. PATENT DOCUMENTS

| | | | |
|---|---|---|---|
| 4,370,710 | 1/1983 | Kroft | 364/200 |
| 4,429,363 | 1/1984 | Duke et al. | 364/200 |
| 4,669,043 | 5/1987 | Kaplinsky | |
| 4,689,765 | 8/1987 | Hooper | 364/900 |
| 4,845,664 | 7/1989 | Aichelmann, Jr. et al. | 364/900 |
| 4,882,642 | 11/1989 | Tayler et al. | |
| 4,899,275 | 2/1990 | Sachs et al. | |
| 4,916,604 | 4/1990 | Yamamoto et al. | |
| 4,926,323 | 5/1990 | Baror et al. | 364/200 |
| 4,933,837 | 6/1990 | Freidin | |
| 4,980,823 | 12/1990 | Liu | 364/200 |
| 5,109,495 | 4/1992 | Fite et al. | 395/375 |

Primary Examiner—Joseph L. Dixon
Assistant Examiner—Behzab James Peikari
Attorney, Agent, or Firm—Ratner & Prestia

[57] ABSTRACT

A cache memory system develops an optimum sequence for transferring data values between a main memory and a line buffer internal to the cache. At the end of a line transfer, the data in the line buffer is written into the cache memory as a block. Following an initial cache miss, the cache memory system monitors the sequence of data requests received for data in the line that is being read in from main memory. If the sequence being used to read in the data causes the processor to wait for a specific data value in the line, a new sequence is generated in which the specific data value is read at an earlier time in the transfer cycle. This sequence is associated with the instruction that caused the first miss and is used for subsequent misses caused by the instruction. If, in the process of handling a first miss related to a specific instruction, a second miss occurs which is caused by the same instruction but which is for data in a different line of memory, the sequence associated with the instruction is marked as an ephemeral miss. Data transferred to the line buffer in response to an ephemeral miss is not stored in the cache memory and limited to that portion of the line accessed within the line buffer.

13 Claims, 8 Drawing Sheets

FIG.1

PRIOR ART

CACHE MISS FACILITY WITH STORED SEQUENCES FOR DATA FETCHING

BACKGROUND OF THE INVENTION

1. Field of the Invention

The present invention relates generally to cache memories in a data processing system and more particularly to the use of stored commands which optimize the content and sequence of data and instruction transfers from main memory to a cache memory.

2. Description of the Prior Art

High performance processors have used cache memory systems as an integral component of overall system design for many years. A cache memory typically has a much faster access time than main storage. For example, cache may make use of a relatively small number of high-speed data storage elements, located in close proximity to an associated processor, while main storage typically uses larger numbers of storage elements and is located at some distance from the processor. Cache memory systems have been designed to overcome the access speed limitation of main storage by providing rapid access to a relatively small set of data which is likely to be used during a relatively short time interval.

These cache memory systems have been designed to take advantage of two properties which have been observed empirically in data processing systems. The first of these properties is known as the spatial locality of reference. This property refers to the tendency of a program, during any relatively small time interval, to access data or instructions which have addresses in the main storage that differ by a relatively small value. Stated another way, this property holds that when a specific target word or datum is used by the processor, it is likely that the immediately adjacent data in the address space of main memory will be used close in time to the use of the target data.

The second property is known as the temporal locality of reference. This property refers to the tendency of a program, during a small time interval, to access the same data or instructions repeatedly. When a specific target datum is accessed by the processor, it is likely that this target will be accessed again within a predetermined time interval. Combining these two properties provides the basic rule for the use of cache memory. A cache system should contain the most recently used data plus the contents of memory addresses neighboring this data.

Transfers from memory to cache are made more efficient by fetching segments containing multiple data words rather than single target words. Up to a limit, the larger the segment fetched, the greater is the likelihood that the next reference to the cache memory will succeed. While the method of fetching data in segments has the advantage of increasing the likelihood of finding data in the cache memory when needed, it also causes a large increase in the total volume of data transferred from main memory to the cache memory. This volume of data can be a source of additional delay in the system if it is not properly managed. Larger segments increase the length of time needed to complete a memory-to-cache transfer. Longer transfer time means more delay before the processor can access the end of the segment. It may also delay the beginning of subsequent transfers between the main and cache memories.

In addition to the above, more elaborate methods have been developed to ensure that most data will be available in cache memory when accesses are requested. For example, U.S. Pat. No. 4,435,759 to Baum et al. relates to a hardware monitor which associates the address of an instruction with the address of the cache operand line miss generated by the instruction. Using this method in a pipelined data processing system, the monitoring system can look ahead and determine which line is likely to be accessed during the next execution of the same instruction. U.S. Pat. No. 4,441,155 to Fletcher et al. relates to a means of reducing the number of cache misses by making the congruence class activity more uniform, focusing on reduction of miss rate. U.S. Pat. No. 4,463,424 to Matteson et al. relates to means for reducing the cache miss rate by subdividing the cache and allocating appropriate sized sections to concurrently executing processes.

Other methods for managing cache utilization involve limits on storing data and instructions in cache so that some information passes directly from the processor to memory or from memory to the processor, without cache storage. Cache status or observed writing activity may be used to selectively inhibit data promotion from memory to cache. U.S. Pat. No. 4,429,363 to Duke, et al. relates to a method of restricting the storage of data in a cache memory system based upon cache status and the most recent memory reference. A memory hierarchy is controlled by monitoring a series of requests for access to memory and indicating when certain events occur. For example, when a record from a Direct Access Storage Device (DASD) (i.e., a disk drive) is not modified in the last portion that was referenced, the contents of this portion may be promoted to cache. Accessing data in a series of requests of this type tends to reduce data promotions. U.S. Pat. No. 4,463,420 to Fletcher relates to a method for selecting lines of data to be replaced in a cache memory system based on Task Identifiers and a method for the early cast-out of lines from the cache memory. U.S. Pat. No. 4,189,770 to Gannon and Liptay teaches a means of passing sequential portions of the cache line to instruction buffers (I-buffers) during an instruction miss.

The above-referenced patents employ criteria for determining when whole segments of data or instructions are to be stored into or excluded from a cache memory. The decision to fetch an entire segment in response to a cache miss results in cache activity which may extend beyond the time needed to transfer the data, the absence of which caused the cache miss. This extended cache activity may result in a decrease in potential cache system performance. The additional delays caused by transfer of contiguous data from memory to cache may negate a part of the performance improvement gained through the use of cache memory to exploit spatial and temporal locality of reference.

One method to improve system performance is to ensure that the line may be accessed, for example from a line buffer, while a line transfer from memory to cache is in progress. This makes the data transferred at the beginning of the segment available to the processor before the whole segment transfer is complete. U.S. Pat. No. 4,370,710 to Kroft relates to a cache memory organization in which cache memory is not locked up and continues responding to the flow of requests made upon it while awaiting the transfer of data from the main memory.

In that system, the data transferred includes the data which caused the miss and the block of data surrounding it. The block of data is transferred in the same order in which it is stored in main memory and portions of the block which have been transferred may be accessed by the processor prior to completion of the block transfer. The Kroft system does not, however, improve performance in the case where the data referenced immediately after the target which caused the miss is located in memory near or at the end of the segment which is transferred. This data will be delayed regardless of the ability to access data in the line buffer.

SUMMARY OF THE INVENTION

Previously, cache memory systems have used a fixed method for determining the sequence in which all of the data or instructions are transferred and stored. The sequence is typically determined only by the locations of data in memory relative to the target. All misses are handled the same way. For optimal performance, a cache management system should take advantage of repetitious behavior in a computer program. The pattern of memory accesses performed by a segment of a program repeats each time the segment executes. In addition, the system should recognize that different program segments may have different patterns of memory access. Finally, the system should recognize that not all program segments exhibit a spatial locality of reference; for these programs no benefit is gained from the transfer of a complete line because only a portion of the line is ever used.

The present invention is embodied in a cache memory system having a Meta-Miss facility. The Meta-Miss facility tends to optimize memory and cache management by associating cache miss responses with the instructions that caused the miss to occur. While the cache miss is processed, references to the line which contained the missed target are monitored. This information is stored in a table reserved for this purpose. This table may be implemented by a set of arrays, registers or local storage reserved for this purpose. Each entry in the table is identified by the instruction that caused the miss. When any of these instructions is executed again, the table entry for the instruction is accessed, providing the processor with a list of data elements, and, optionally, a preferred order for transferring data from the main memory to the cache.

In addition to properly sequencing the data within the transferred line, a Meta-Miss facility in accordance with this invention may provide criteria for determining that the line should not be entered into cache because, for example, data in the line is not referenced by instructions following the instruction that caused the miss. The Meta-Miss facility may also provide for the transfer of a limited subset of the data in a line to the line buffer, when the facility detects that the line is not accessed from cache. In this configuration, the processor transfers only the data that are actually used from the main memory. This strategy avoids unnecessary line replacements and tends to reduce thrashing.

DETAILED DESCRIPTION OF THE PREFERRED EMBODIMENT

The following is a description of an exemplary Meta-Miss facility in accordance with the present invention.

Cache memory systems are typically used in modern mainframe computers such as the S/370 processors manufactured by IBM Corporation. In a system of this type data are stored in a main memory. A processor sends its requests for data to a cache memory. If the cache contains the target of these requests, they are satisfied without involving the main memory. If however, the target of a request does not reside in the cache memory, then a cache miss occurs. The cache miss is resolved by requesting the target word from the main memory. A fixed size segment, containing the target word, is transferred to the cache memory via a line buffer to take advantage of spatial localities of reference in the program.

The present invention is embodied in a system in which a memory controller is instructed to alter the sequence in which the data within a line are provided from main memory to coincide with the order in which they are used by the program which accesses them. The information supplied to the memory by the memory controller is tailored for the respective program instructions which cause the cache miss. The resequencing is performed to reduce the delay which may be experienced for subsequent cache misses caused by these same instructions.

In addition to resequencing, it is also desirable to provide for partial line transmissions from the memory if it is known that the program will not use all of the line. Another desirable feature is a facility which distinguishes those targets that do not need to be transferred to cache, but should only be provided to line buffer. Both of these features are used in responding to a type of cache miss which will be referred to as an ephemeral miss. An ephemeral miss, as used in this description, occurs when a line is retrieved from memory (following a cache miss) and, during the time that the line is being retrieved from memory, the same instruction which caused the original miss causes a cache miss on data in a different line.

A system in accordance with the present invention meets these objectives by generating instructive commands for resequencing the data which is accessed from memory following a cache miss. For each program instruction which results in a cache miss, a prospective resequencing command is created. If accessing the data in the sequence indicated by the resequencing command would improve system performance, the command is stored and is subsequently retrieved each time the respective instruction causes a cache miss. Empirical data derived from the access patterns of the processor allows optimization of the sequence in which data is retrieved from memory. The present invention also provides a method for retrieving sequences which include only part of the data in the accessed line and criteria for determining when it is desirable to retrieve only a partial line.

Use of the resequencing commands, partial line retrievals and commands to selectively bypass the cache memory improve the performance of data processing systems which include cache memory systems. These techniques ensure that the data used first will be fetched first from memory. In addition, these techniques tend to reduce the total volume of data transferred from the main memory to the cache memory.

Figure 1:
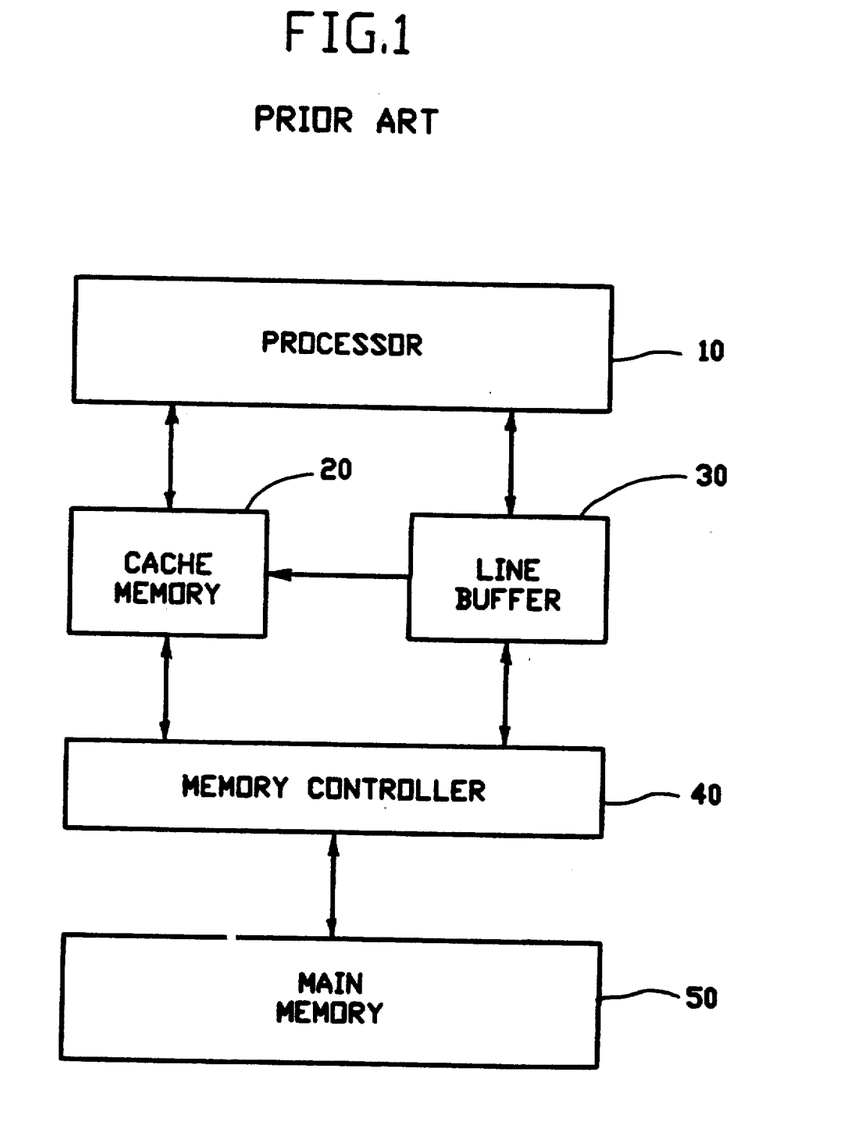
FIG. 1 is a block diagram of a prior art cache memory system.

FIG. 1 is a block diagram of a typical prior art system including a processor 10, a cache memory 20, a line buffer 30, a memory controller 40, and a main memory 50. The processor 10 requests a word of data (e.g. a 32-bit digital value) from the cache 20 by providing the address of the word to the cache 20. This word is referred to below as the target word. If the cache 20 contains the multi-word segment or line of data in which the target word resides, then the request may be satisfied without fetching data from the main memory 50. If, however, the target word is not present, a cache miss occurs. The cache 20 provides the address of the missed word to the controller 40. Responsive to this address, the controller 40 instructs memory 50 to provide a double-word (e.g. 64 bits) which includes the target word to line buffer 30. Line buffer 30 then makes the target word available to the processor 10.

When the target word is transferred from the main memory 50 to a line buffer 30, the exemplary system attempts to take advantage of the spatial locality of reference by transferring the remainder of the line of data, in which the target word resides, one double-word at a time, from the memory 50. Thus, when a cache miss occurs, the processor receives the data value it has requested plus additional data values that constitute the line in which the target word resides. The size of a line is typically fixed.

In the examples discussed below, a line of data contains 128 bytes and is aligned on a 128 byte boundary. The line comprises 16 double-words (referred to as DWs); each DW includes 8 bytes and begins on an 8-byte boundary. Thus, when processor 10 attempts to access a target and a cache miss occurs, memory 50 returns a line containing the target word plus an additional 31 words. One skilled in the art may readily extend this system to other cache line sizes and word sizes.

The following sequence is typical of the sequences used by prior art cache systems for all transfers from memory 50 to cache 20. In the sequence, the target address is in the first DW returned. The remaining DWs in the line are returned and entered in line buffer 30 in the order of increasing DW address. If the target DW does not have the lowest address in the line, the DWs whose addresses are lower than the target follow the DW with the highest address (e.g. 13, 14, 15, 0, 1, 2,...). This sequence is referred to as the "default" sequence.

The contents of the line buffer 30 are placed in cache 26 20, following completion of the line transfer. During the line transfer, the individual DWs which have been transferred may be accessed by the processor 10 from the line buffer 30. At the completion of the line transfer, the entire line buffer is stored into the cache.

Figure 2:
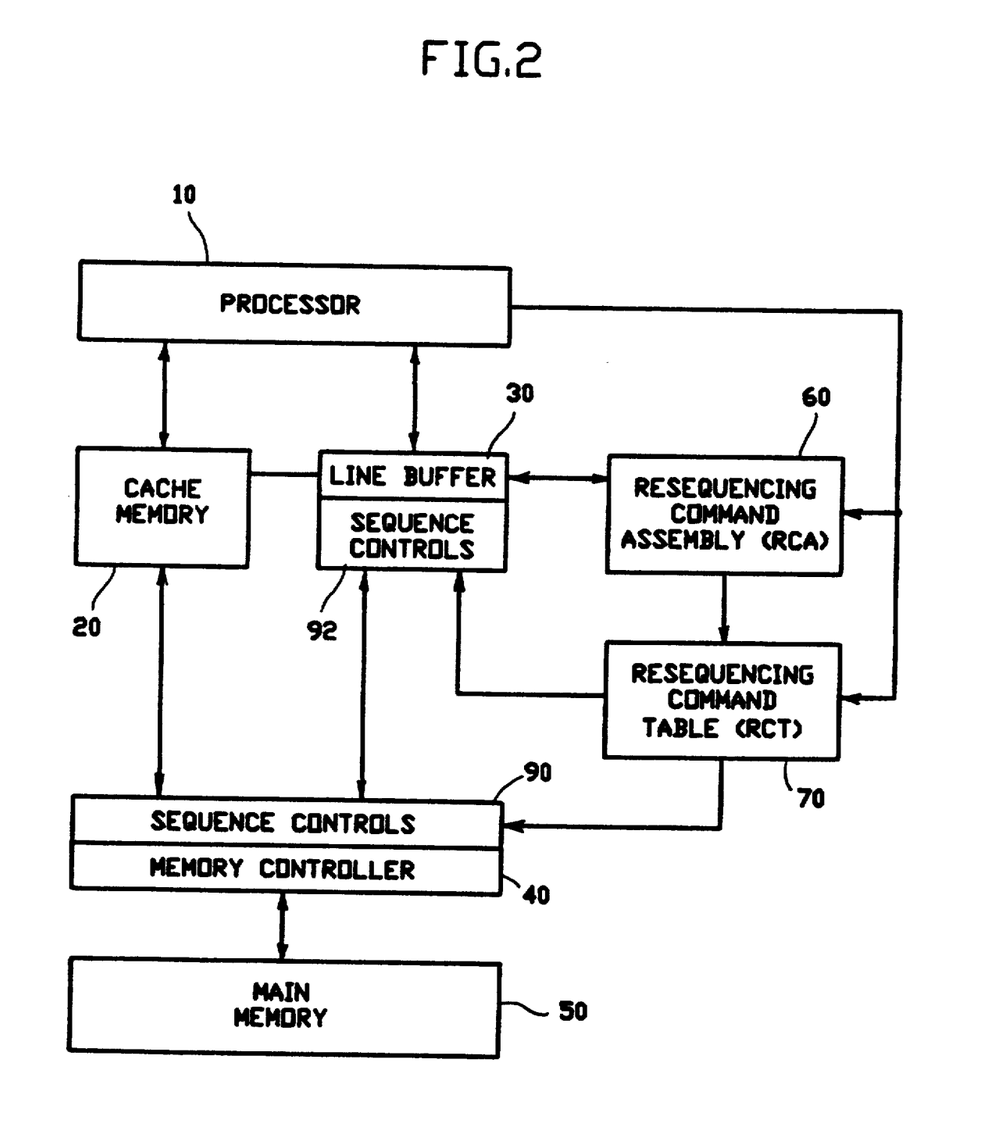
FIG. 2 is a block diagram of a cache memory system which includes an embodiment of the present invention.

FIG. 2 is a block diagram of an improved data processing system which includes an embodiment of the present invention. When a cache miss occurs in the system shown in FIG. 2, processor 10 determines whether a command has previously been stored to resequence the line which is retrieved from memory 50. If no resequencing command is found for the instruction, the data is retrieved from main memory 50 in the default sequence. In any case, a resequencing command assembly (RCA) 60 monitors the words that are stored into the line buffer and the cache accesses made by processor 10 during the time that data is transferred from the memory 50 to the line buffer 30. The RCA 60 determines which DWs in the line are used during the line transfer. RCA 60 also determines the sequence in which the DWs are used. The result of this monitoring is a resequencing command which describes a preferred order for accessing the words in the target line. This command is stored into a resequencing command table (RCT) 70 only if at least one word in the line was not in the buffer when it was requested by the processor.

If, on the occurrence of a cache miss, a resequencing command is found which corresponds to the instruction which caused the miss, the RCT 70 provides the line buffer 30 and the memory 50 with information defining the preferred sequence for providing DWs from the main memory 50. Sequence controls 90 are added to memory controller 40 to ensure proper resequencing of the DWs by memory 50 before transmission. The sequence controls 90 for line buffer 30 coordinate the reception of the resequenced DWs from memory 50.

Figure 3:
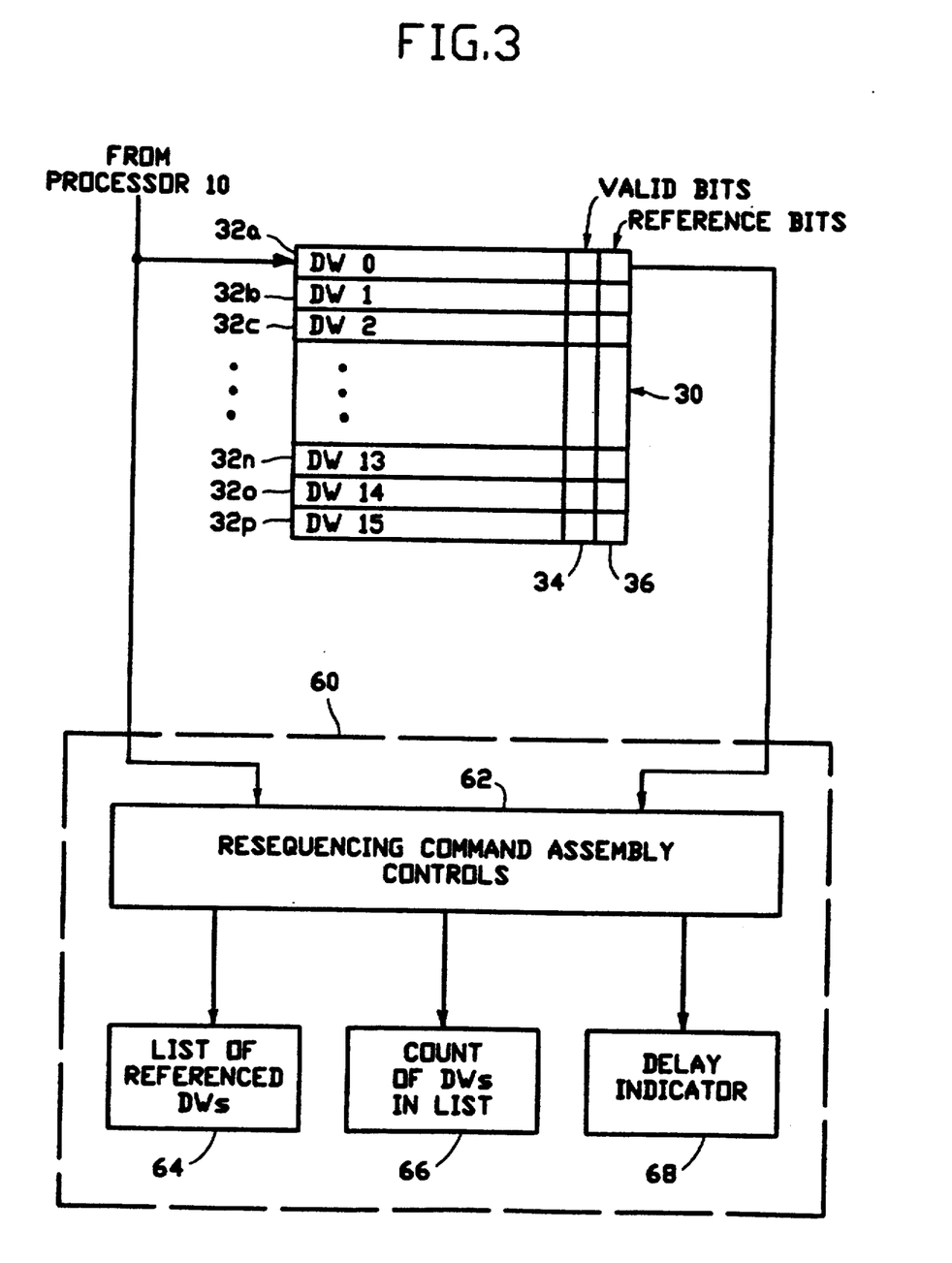
FIG. 3 diagram showing the relationship between the line buffer and the resequencing command assembly controls used in the cache memory system shown in FIG. 2.

FIG. 3 shows in greater detail how resequencing commands may be generated using controls within line buffer 30 and RCA 60. This implementation assumes that the processor 10 can access the line buffer 30 in parallel with the accesses it makes to the cache memory 20.

Line buffer 30 contains the DWs 0-15 in respective fields 32a-p. The data for the DWs are entered into the appropriate fields as they are read in from memory 50 (e.g., The DW with the lowest address in the line is placed in DW 32a; the DW with the highest address is placed in DW 32p). The DWs 32a-p have respective valid bits 34a-p and respective reference bits 36a-p which supply information relating to the status and access history of the DWs 32a-p.

When the cache miss first occurs, all valid bits 34a-p and reference bits 36a-p are set to indicate that the double words DW0 through DW15 are invalid and unreferenced. When the DWs DW0 through DW15 are loaded from main memory 50 into line buffer 30, the respective valid bits 34a-34p are set to indicate valid data. Reference bits 36a-p are set to indicate referenced data when their respective DWs 32a-p are accessed by processor 10 for the first time.

When a cache miss occurs, the target DW is transferred from memory 50 to line buffer 30 first. The valid bit for this DW is then set to valid. As each successive DW is received by line buffer 30, its respective valid bit is set.

As data is being transferred from memory 50 to line buffer 30, the RCA 60 is assembling a resequencing command. RCA 60 comprises RCA controls 62, a memory 64 which holds a time ordered list of referenced DWs in terms of their location in the line buffer 30, a register 66 which holds a count of the number of DWs in the resequencing command, and a delay indicator 68 which is set only if the processor waits for a data value provided during the line transfer.

When the cache miss first occurs, the memory 64 contains one entry, a pointer to the location of the target DW in the line buffer. The value in the DW count register 66 is one and the delay indicator 68 is reset.

When the target DW has been transferred to the line buffer, the processor 10 accesses the target word and then resumes its activity. Depending on the timing of access requests subsequent to the one which caused the miss, several different actions may occur which affect the contents of the resequencing command.

Figure 4:
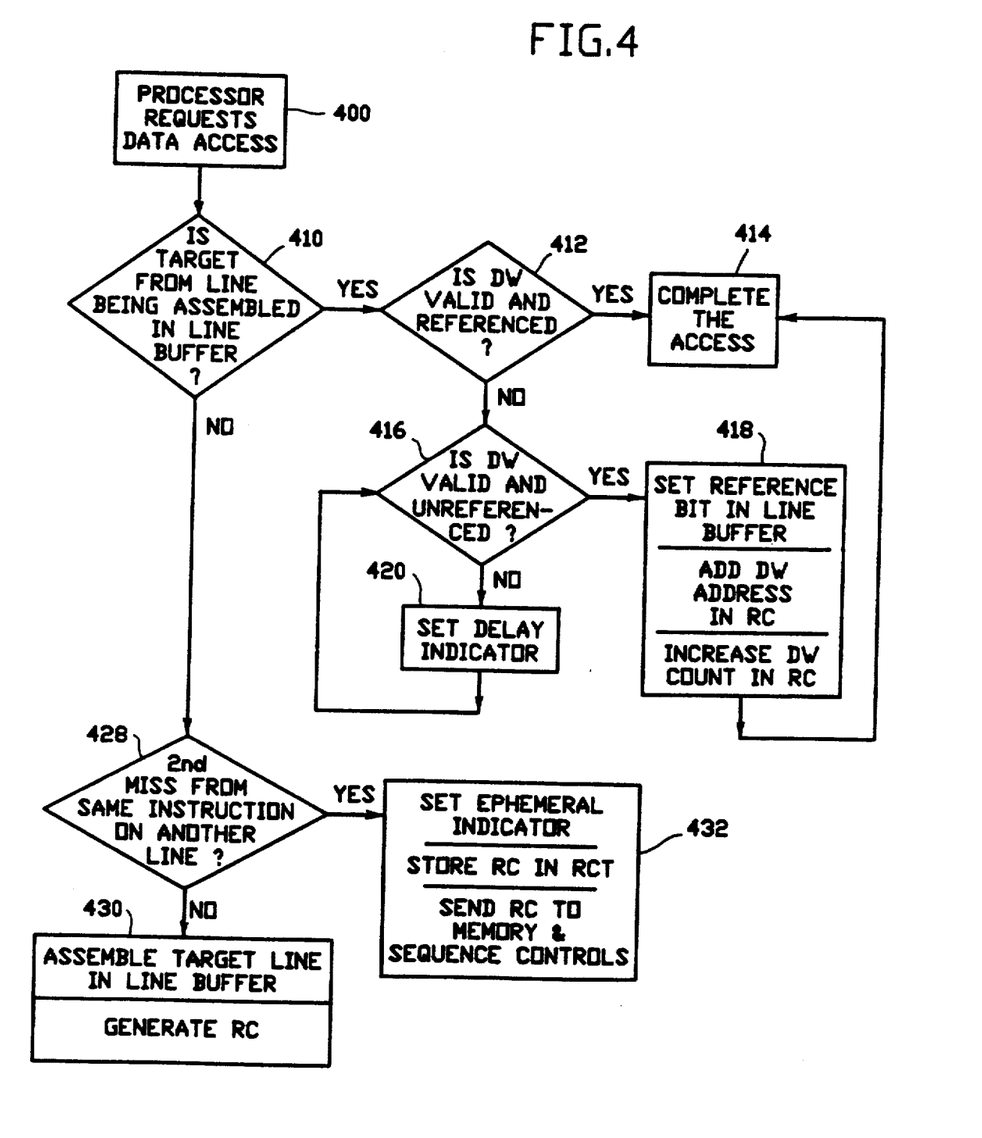
FIGS. 4 and 4A are flow chart diagrams showing an exemplary method of generating a resequencing command for the cache memory system shown in FIG. 2.

FIG. 4 is a flow chart which summarizes the steps, followed each time processor 10 requests a DW, which result in the generation of a resequencing command. At the threshold step 410, a determination is made whether the DW which processor 10 is accessing is contained in the line currently being transferred from memory 50 to line buffer 30.

If a line is being transferred and the DW accessed by processor 10 is within that line, one of the following three steps will occur:

If, at step 412, the accessed DW is in line buffer 30, is valid (already transferred from memory 50) and is referenced (already accessed by processor 10 since being transferred from memory 50 to line buffer 30), the DW is provided to processor 10 (step 414). In this instance, no changes are made to valid bit 34, reference bit 36, list 64, count 66, or delay indicator 68.

If, at step 416, the accessed DW is within line buffer 30 and is marked valid (already transferred from memory 50 to line buffer 30) and unreferenced (not previously accessed by processor 10), the step 418 is executed. At step 418, the DW is provided to processor 10, the reference bit 36 is set to the referenced value, the four bit designation which specifies the position of DW 32 within the line is added to list 64 and the count value 66 is increased by one. The valid bit 34 and the delay indicator 68 are not affected by this access.

If, at step 416, the accessed DW in line buffer 30 is marked invalid (not yet transferred from memory 50 to line buffer 30), the DW cannot be provided to processor 10 at this time. In this instance, the step 420 is executed in which the delay indicator is set. The processor 10 then loops through the steps 416 and 420 until the target DW is written into the line buffer 30. When this occurs, the step 416 branches to step 418 which performs the operations set forth above. The transfer is completed by a branch to step 414 in which the DW is provided to the processor 10.

Figure 4A:
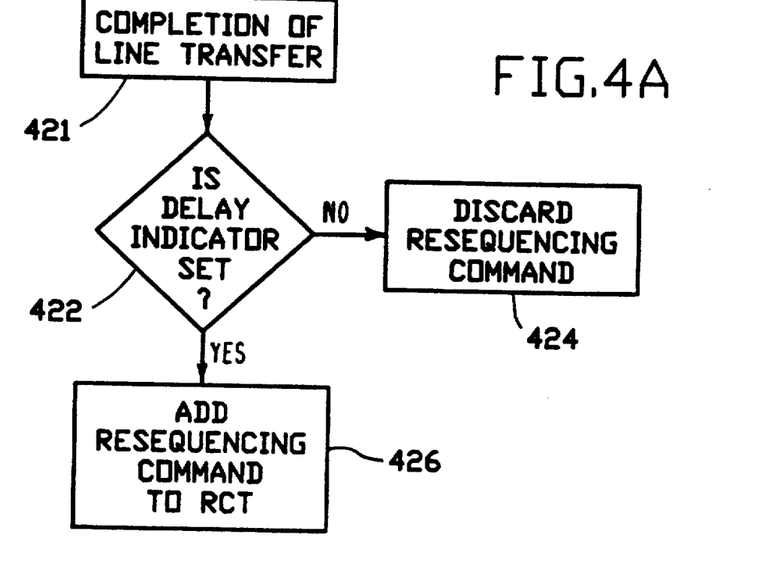

At the conclusion of the line transfer from memory 50 to line buffer 30, the actions shown in FIG. 4A, starting at step 421 are undertaken. At step 421, the RCA controls 62 check the delay indicator 68. If, at step 422, the delay indicator 68 has not been set, then the resequencing command which has been assembled is discarded at step 424. In this instance, the indicator 68 reveals that each DW referenced by processor 10 was available when requested. None of the processor's data accesses were delayed so there is no benefit to be gained from further resequencing.

If, however, the delay indicator 68 is set at step 422, the resequencing command that has been assembled is stored in the RCT at step 426. This command is automatically retrieved from the RCT upon recurrence of the instruction which caused the cache miss. Processor performance improves from the resequencing of the DWs as they are transferred from memory 50 to line buffer 30 because the time spent by the processor waiting for data is reduced. It may be desirable to transfer non-referenced DWs to later time positions in the sequence or to omit them from the sequence altogether. This may be done, for example, if any non-referenced DWs are transferred from memory 50 during the first execution of an instruction. It is not desirable to continue to monitor DW references which occur after the completion of the line transfer since all of these DWs are available in the cache when they are referenced by processor 10, so no benefit can be derived from further resequencing.

If, at step 410, a line is currently being transferred due to a cache miss from the execution of a given instruction and the DW accessed by processor 10 is not within that line, then an attempt is made to retrieve the target from cache memory 20. If the target is not in cache memory 20, a new cache miss has occurred.

If the target DW is not in the line buffer 30 at step 410, an evaluation is made at step 428 as to whether an ephemeral miss has occurred. An ephemeral miss occurs if: a line is currently being transferred from memory 50 to line buffer 30 in response to a memory access requested by a given instruction; and a cache miss occurs for the same instruction but for a word in a different line.

If these conditions are met at step 428, the resequencing command for the previous miss is stored as a resequencing command table entry (RCTE) in the RCT 70 at step 432. The structure of the RCT and an RCTE are described below in reference to FIGS. 5A and 5B.

Referring to FIG. 4, when it is determined that an ephemeral miss has occurred at step 428, the ephemeral indicator 80 is turned on at step 432. Since the line currently being assembled in the line buffer 30 satisfies the same instruction that has caused the current cache miss, the resequencing command generated from the line in line buffer 30 is used for the current cache miss. This same RCTE 72 is used for current and future cache misses caused by this instruction, transferring DWs from memory 50 to line buffer 30 in the order in which they are used.

It is assumed that each time this instruction is executed, it causes an ephemeral miss, and a respectively different line of data is referenced. Only the DWs that were actually referenced are transferred to the line buffer and the contents of the line buffer are not transferred to the cache memory 20.

All accesses for this data are handled from the line buffer 30. The relative positions and sequence of the DWs accessed within these lines, however, remain constant. As no in-cache reference occurs for a the line of data accessed in response to a truly ephemeral miss, only those DW's recorded in the RCA are accessed.

This information may be used to reduce the memory traffic on the occurrence of an ephemeral miss to just the recorded DW's.

The ephemeral miss is a special case from a performance improvement perspective, because it occurs when there are no in-cache references to the target data. Data is typically transferred from memory 50 to cache 20 because of the likelihood that the data will be used in the near future due to temporal and spatial locality of reference. When it is empirically shown that the line referenced by processor 10 in executing a specific instruction will not be referenced again before or during the next execution of the same instruction, there is no expected benefit from storing the line in cache 20. The present invention allows reduction in the volume of data transferred to cache 20 without significant deleterious impact.

If, at step 428, it is determined that an ephemeral miss has not occurred, step 430 is executed, including the transfer of the line containing the DW to the line buffer 30 and the generation of a new RCTE 72. Following completion of step 414, 424, 426, 430, or 432, the processor 10 may execute another instruction and initiate further data requests at step 400.

Figure 5A:
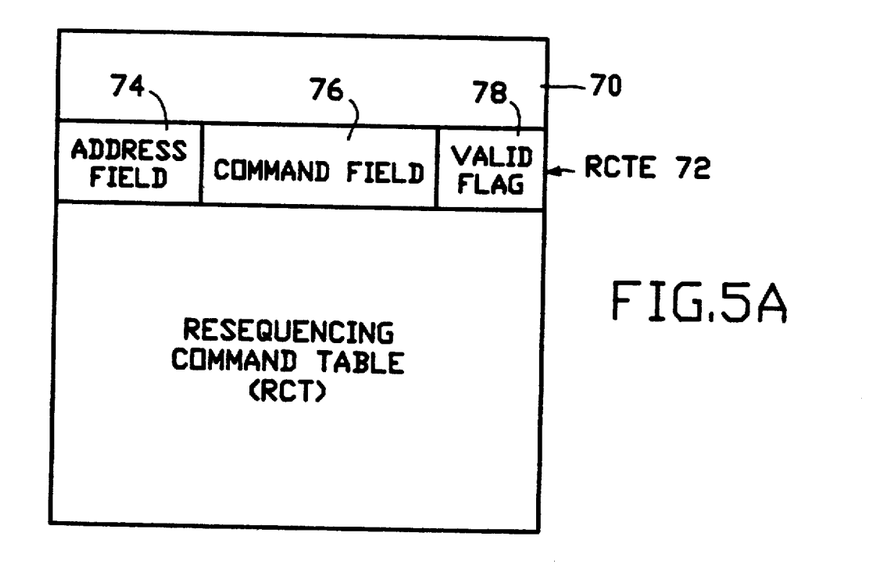
FIGS. 5A and 5B are data structure diagrams showing details of an exemplary format for a resequencing command table suitable for use with the cache memory system shown in FIG. 2.

Referring to FIG. 5A, the structure of RCT 70 is shown in detail. This RCT has K entries (RCTEs) where K equals $2^N$. Each RCTE in the RCT 70 is addressed by a hash function generated from M bits of the address of the instruction which caused the cache miss for which the RCTE was generated. Each RCTE includes an (M-N) bit address field 74 which holds the bits of the M-bit instruction address which were not used for the hash function. Upon encountering a cache miss, the selected N bits of the instruction address are used to address the RCT. Then, the address field of the addressed entry is compared to the remaining (M-N) bits of the instruction address. If these are equal, then the addressed entry is for the instruction that caused the miss. Otherwise it is not.

If the entry is not for the instruction which caused the miss, a new RCTE, if one is generated in response to the instruction, will overwrite the existing entry.

Figure 5B:
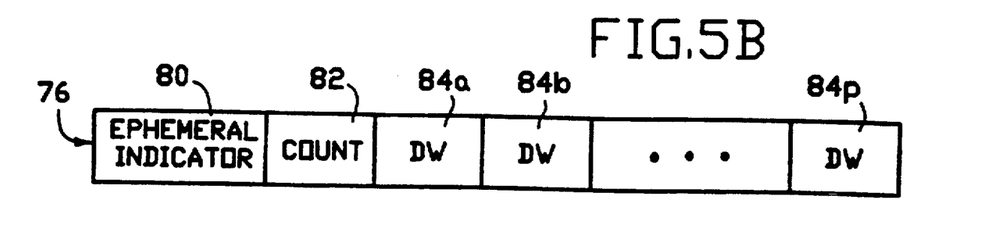

The command field 76, as shown in FIG. 5B, contains the actual resequencing information. An ephemeral indicator 80 is used to mark those instructions which represent ephemeral misses, as described above. DW count 82 provides the number of DWs which were actually referenced when the RCTE was being assembled. The remaining 16 designation fields, 84a–84p, provide, in the appropriate temporal order, the position within the line for each of the DWs which is referenced during execution of the instruction. In this embodiment of the invention, the designation fields 84a–84p are four-bit values which indicate respectively different double words in the line.

The final field in the RCTE 72 is the valid bit 78. When the system is first used, the valid bits 78 for each of the RCTEs are turned off. As RCTEs are stored, the valid bit for each new RCTE is turned on.

Figure 6:
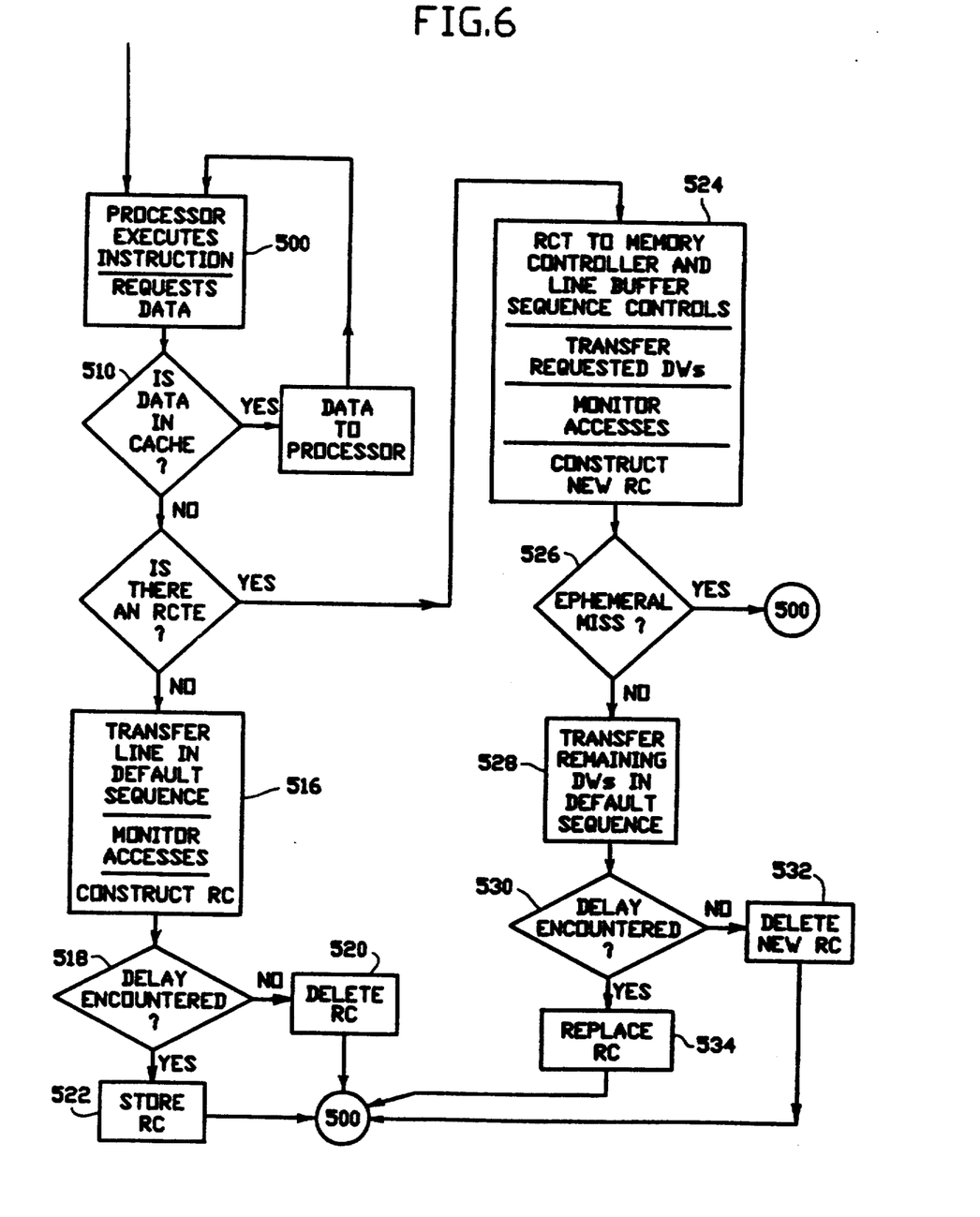
FIG. 6 is a flow chart diagram showing an exemplary method of performing cache memory transfers using the resequencing commands shown in FIGS. 5A and 5B.

FIG. 6 is a flow chart which describes the method of retrieving DWs from memory 50 both in the presence and absence of a resequencing command. Following a data access request by processor 10 at step 500, step 510 is executed. At step 510, a determination is made whether the target is in cache memory 20. If so, the data is returned from the cache memory 20 at step 512. If not, an evaluation is made whether an RCTE exists which can be used to satisfy the request.

If there is no valid RCTE 72 associated with the instruction which causes a cache miss, memory 50 is conditioned at step 516 to return the DWs in the line using the default sequence. In this instance, the RCA 60 is used to determine if a resequencing command should be generated. The DW containing the target data value is returned first, followed by DWs with higher addresses in sequential order. These are followed by DWs (if any) with lower addresses than that of the target data value, also in increasing sequential order. DW references are monitored, as shown in FIG. 4, to determine whether the requisite criteria are satisfied to establish a resequencing command. If, at step 514, there is a valid RCTE associated with the instruction which causes the cache miss, step 524 is executed. In this step, the memory controller 40 accepts and interprets the resequencing command by first determining the DW count 82, which is the number of DWs under control of the RCTE (i.e. the DWs that were referenced during the transfer of the line to buffer 30). This number of DW designators 84a–p is provided from the command field of the RCTE in the appropriate temporal sequence by the memory controller 40.

Following the transmission of designators 84a–p, the memory controller 40 evaluates the ephemeral indicator 80 at step 526 to determine if the current cache miss is an ephemeral miss. If the miss is ephemeral, then the memory controller 40 terminates its transmission and control is returned to step 500. Line buffer 30 also has access to the RCTE and is similarly prepared for the end of transmission after the referenced DWs in the case of an ephemeral miss.

If, at step 526, the current cache miss is determined not to be ephemeral then step 528 is executed. In step 528, the memory controller 40 transmits the indicated number of 4-bit designators 86 in temporal sequence just as for the ephemeral miss. For the non-ephemeral miss, however, all of the remaining DWs in the line are also transmitted. This step takes advantage of the full cache line size (and the temporal and spatial localities of reference). The remaining DWs are transferred in the default sequence except that the DWs which were loaded under control of the RCTE 72 are skipped over. This sequence includes increasing addresses beginning with the smallest address greater than the target address (if any). Following the greatest address, those addresses smaller than the target (if any) are sent in increasing sequential order.

The line activity is monitored automatically for references and delays even when a resequencing command is used. At the end of any line transfer, the RCA 60 determines whether a delay was encountered at step 530. If an RCTE is used to respond to a cache miss, and no delay is encountered at step 530, then step 532 is executed and no new RCTE is created for this instruction. The old RCTE is retained until execution of step 530 indicates that a delay has occurred using this RCTE. In this instance, the delay indicator is found to be set and the RCTE generated while handling the miss replaces the previous RCTE in the RCT. This procedure is identical to that described above in reference to FIG. 4A.

One skilled in the art will understand that the embodiment described above is only one of many possible variations for the invention which make use of the resequencing concept. Although the discussion above focused on single-processor configurations, cache memory systems are used extensively in multi-processor configurations, and the invention may be used in these systems as well.

Figure 7:
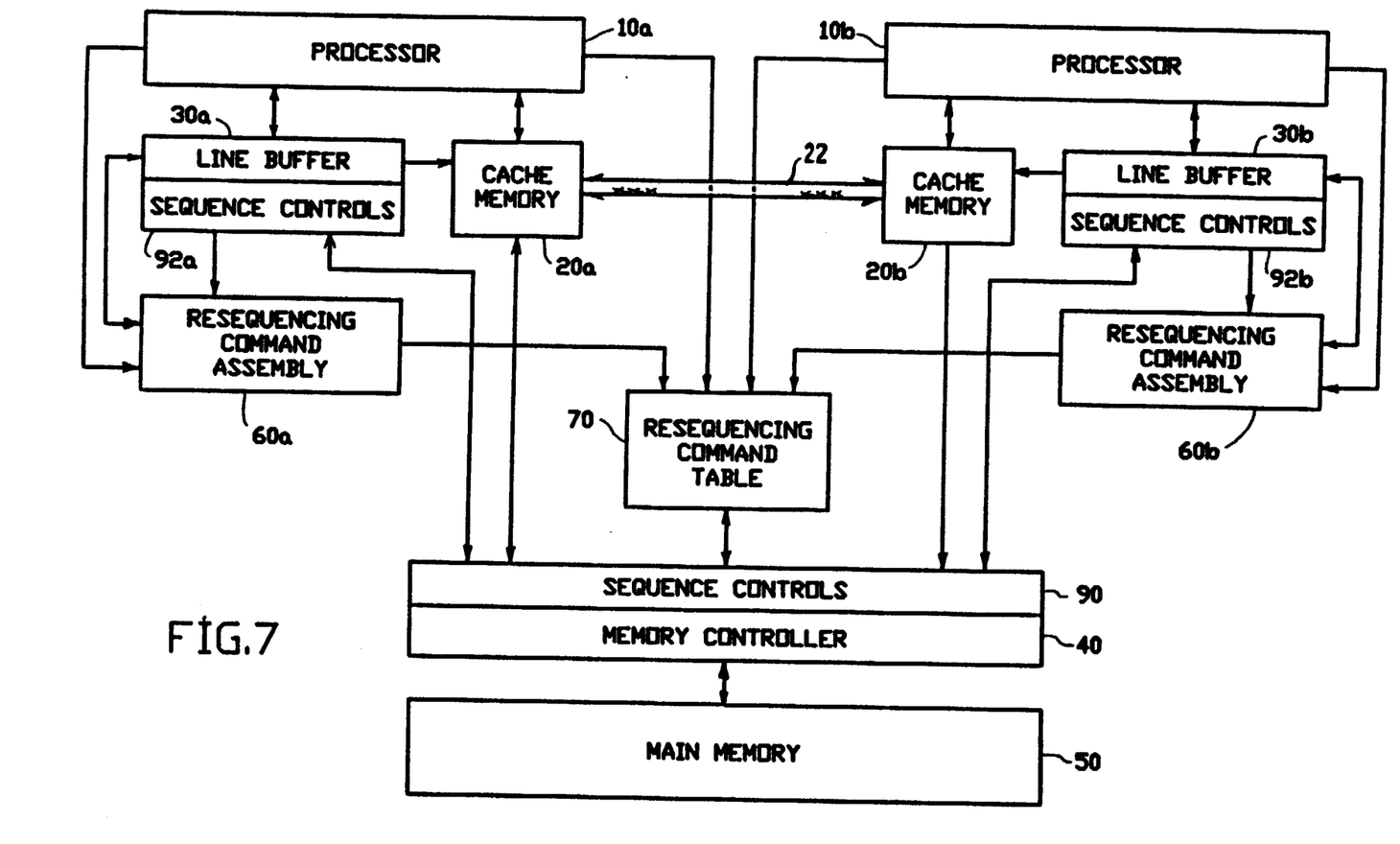
FIG. 7 is a block diagram of a data processing system using the cache memory system shown in FIG. 2 in a multiprocessor configuration.

FIG. 7 shows a two processor configuration which includes an embodiment of the invention. Items which are common to both single and multi-processor systems are identified with the same reference numbers in FIG. 7 as in FIG. 2. Processors 10a and 10b operate in a multi-processing environment with shared main memory 50, memory controller 40 sequence controller 90, and shared RCT 70. Each processor, (10a, 10b), has its respective cache memory (20a, 20b), line buffer (30a, 30b), and RCA (60a, 60b).

Each of the processors 10a and 10b operates in a the same way as the single processor 10 described above. Following a cache miss, data is transferred from main memory 50 to a respective line buffer 30a or 30b and from there, to a respective cache memory 20a or 20b. A respective RCA 60a or 60b generates an RCTE as the miss is processed. If a delay resulting from the sequencing of the returned data is encountered during the line transfer, the respective RCTE is stored in RCT 70. During subsequent executions of the same instruction, the RCTE 72 will be used to alter the sequence in which sequence controls 90 and memory controller 40 transfer data to the line buffers 30a and 30b.

The multiprocessor implementation contains additional capabilities not found in the single processor version. When a target is first determined to be absent from the cache memory 20a, cache memory 20a issues a request to the memory controller 40, for access to the data. The memory controller 40 takes the necessary steps to obtain a copy of the line of data which includes the requested data items. If the data is present in cache memory 20b, it may be transferred by a direct cache-to-cache bus 22 without accessing main storage.

The use of a common RCT by the two processors 10a and 10b allows each processor to make use of the RCTEs generated by the other processor. Thus, each processor may experience a reduced number of first-time cache misses for which no RCTE is available.

While this example is presented in the context of a two-processor system, one skilled in the art can readily extend the system to include a larger number of processors.

A second alternative embodiment includes a single processor configuration similar to that described above. In the previous embodiments of the invention, the designators 84a–84p were each four-bit values that represented the addresses of the DWs in a line. These four-bit values allowed each double word to be specified relative to the start of the line. This approach works well when the rows in a data array line up along cache memory line boundaries (e.g., when, in the present embodiment of the invention, the array row sizes are evenly divisible by 32 words). In this case, each execution of the instruction that causes the miss will attempt to access a DW in the same absolute position within the target line. To gain the full benefit of this embodiment of the invention, the user should restrict array sizes so that they match the cache memory line size.

To make the most efficient use of memory, it may be undesirable to impose this restriction on array sizes. But, if the array rows are sized differently and do not line up with cache memory line boundaries, the target which causes the cache miss may appear at any position 0–15 within the line transferred to cache memory and the designators 84a–84p may not indicate the preferred order for transferring words to the line buffer. In this instance it may be desirable to specify the DW reference sequence relative to the address of the DW that caused the cache miss instead of as an absolute word address in the line. Since the DW that caused the miss may be positioned anywhere between the beginning and end of the line, these relative position indicators may have values that vary between −15 and +15. Values in this range may be represented by five binary bits. Thus, in this alternative embodiment of the invention, the designators 84a–84p are five-bit values.

In addition, to the above, the sequence controls 90 used in this embodiment of the invention includes an adder (not shown) which adds a sign-extended twos complement version of the five-bit relative address to the address of the target DW to generate the addresses for the other DWs in the line.

When relative addresses are used, the relative addresses specified in the RCTE 72 may point to DWs located in the line prior to the line which contains the target or in the line following the target line. In either case, any DWs located outside of the target line are treated as though they were not listed in the RCTE. In this instance, a second cache miss occurs when these data values are referenced, which is processed separately. The use of five-bit relative addresses provides greater flexibility than the four-bit addresses with only a relatively small increase (2 bytes per RCTE) in the size of the RCT 70.

Specifying the DW addresses by relative positions is particularly beneficial when processing an ephemeral miss. An example of a data structure in which an ephemeral miss is likely to occur is a linked list of control blocks in which each block contains a pointer to the next control block. In a fixed block structure, this pointer would be in a location separated by a fixed displacement relative to the address of the word in the block that, when accessed, causes the miss. This word may, for example, contain a test value which indicates when a desired block has been accessed. The RCT 70 is used to optimally sequence data located at the same memory address for non-ephemeral misses. In the case of ephemeral misses, each execution of the instruction accesses a different memory address.

In a third embodiment of the present invention, the number of designation fields 84 (see FIG. 5B) in an RCTE, may be limited to some number less than the number of DWs in a line, for example, eight.

By reducing the size of the RCTE 72, a number of advantages may be realized. The complexity of the resequencing command is reduced and the command traffic between processor 10 and memory 50 is reduced. In addition, the RCT 60 occupies less memory.

This embodiment of the invention may be used with 4-bit absolute addresses as in the first embodiment, or with 5-bit relative addresses, as in the third embodiment. It is understood by those skilled in the art that the criteria for deciding whether to use 4 or 5 bit addresses is the same, regardless of whether the RCTE size accommodates the full number of DWs in a line, or only a fraction of that number of DWs.

A fourth embodiment of the invention involves a further simplification of the apparatus described above. In this embodiment, the RCTE command field entry 76 (see FIG. 4) is replaced by a 16 bit vector. The bits in this vector are set to indicate whether the respective DWs within the line are referenced during the line transfer time.

The only resequencing information conveyed by this bit vector is whether a DW was referenced during the line transfer time. Instead of transferring the DWs in the order in which they are referenced, this embodiment gives priority to the DWs represented by the bit vector. All of these DWs are transferred before any unreferenced DWs. Within the two groups (referenced and unreferenced) the DWs are transferred in the default sequence. As is the case with the first embodiment of the invention, if array sizes are used which do not match the cache memory line size, the information conveyed by the bit vector may not, in all cases, reflect the desired priority for bringing words into the line buffer.

The advantages of this embodiment are mainly in its relative simplicity and efficient use of resources. The size of RCTE 72 is reduced by 6 bytes, and the entire RCT 70 size is reduced accordingly. The sequence controls 90 used in this embodiment may be simpler to implement.

In a fifth embodiment of the invention, the RCT may be completely eliminated. This embodiment employs an alternate method of establishing the sequence of DW references. Rather than monitoring accesses and collecting reference data in a resequencing command, this embodiment of the invention employs a facility (not shown) integral to the processor 10 which scans ahead to the instruction which follows the instruction that is currently being executed to determine if it accesses data in the line that is currently being loaded from the main memory 50. This embodiment may be particularly appropriate for use in a pipelined processor system in which the processor decodes upcoming instructions while the current instruction is being executed.

In this type of system, the succeeding instructions may be obtained with reference to a branch history table to ensure that the data references applied to the sequence controls 90 reflect the order in which data values will be used by the program.

In this embodiment of the invention, the RCT 70 is optional, since the reference data can be regenerated each time the instructions are read by processor 10. However, this embodiment may not provide as large an increase in processor efficiency as the other embodiments set forth above. This is because the processor may not be able to instruct the memory controller in a timely manner concerning the correct sequence of requested DWs. This scanning approach depends heavily on the timing parameters of the memory system, consequently, when this scheme is used, the processor may experience delays waiting for data.

Any of the above embodiments may be improved by the addition of a capability to respond to a second cache miss while a first cache miss is being handled. To implement this capability, a queueing facility may be associated with the memory controller 40 and the line buffer 30. During the transfer of a line of DWs following a cache miss, an instruction may be executed which attempts to access a DW from another line not in cache memory 20. This attempted access may be the first access request made for data within the line transfer time of the original cache miss.

In this instance, the processor may experience a delay while the first line is brought into the cache before the access to the second line can be handled. Performance may be improved by interrupting the initial line transfer to service the second cache miss. Following completion of the second line transfer, the initial line transfer may be completed. To implement this feature, the state of progress of the initial line transfer is desirably stored in a push-down stack while subsequent misses are handled.

The handling of nested misses, that is to say a miss within a miss, uses another indicator within the RCTE. This indicator is set by the RCA, during the first encounter of the nested miss, and then is used whenever the RCTE is used. The memory controller operates asynchronously with respect to the processor and is desirably cued by this indicator to put data representing the miss-in-progress onto a stack, after it has provided the referenced DWs, so that it may handle another miss that is imminent.

Figure 8:
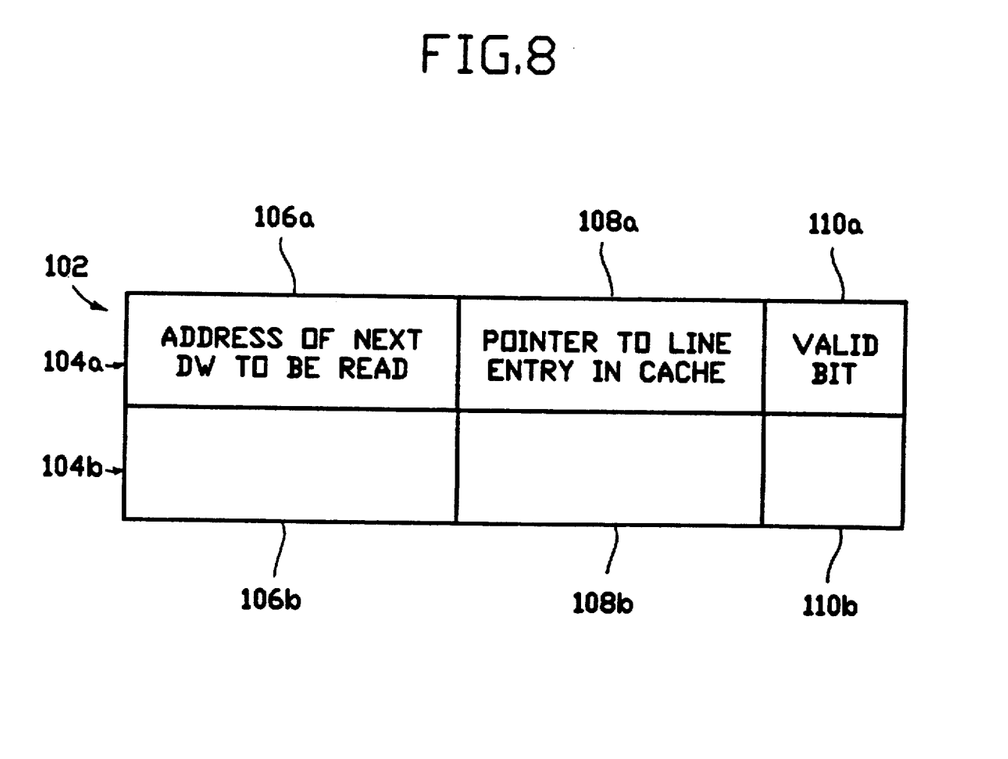
FIG. 8 is a data structure diagram useful for describing an extension of the present invention..

This type of activity is directly analogous to the handling of the ephemeral miss by the memory controller with the exception that, at the completion of, for example, the second miss, the stack is popped and the first miss is completed. The information garnered by the RCA identifies the portion of the line that is accessed before the second miss occurs and allows the memory controller to produce only the required portion of the first miss to expedite the handling of the second miss An exemplary stack is illustrated in FIG. 8. The stack used in this embodiment of the invention is stored in a dedicated memory in the sequence controls 90. Each entry in the stack identifies an incomplete line and the progress of the line transfer at the time of the interrupt. The stack shown in FIG. 8 includes stack entries 104a 104b. Each stack entry includes a pointer (e.g. 106a) to the address of the next DW in the line currently being read, an index (e.g. 108a) to identify the address of the line in the cache memory 20, where the partially filled line buffer has been stored, and a valid bit (e.g. 110a).

In this embodiment of the invention, it is assumed that all of the DWs designated in the RCTE have been processed when the second miss occurs. Accordingly, the stack 102 does not need to keep a pointer to the RCTE for the first miss. The DWs for the continued first miss are handled in the default sequence.

Referring to FIG. 2, when the second miss occurs, the sequence controls 90 signal the cache memory 20 to store the current partially filled line buffer as an invalid line. Then, the controls 90 generate a stack entry by concatenating the address of the next data value to be read with a pointer to the line in the cache. This stack entry is pushed onto the stack 102 and is marked valid.

The second miss is handled in the manner set forth above. When processing is completed for any miss, the stack 102 is examined for valid entries. In this instance, the entry for the partial first miss is found. The address of the next DW contained in this entry is sent to the main memory 50 while the partial line buffer is retrieved from the cache memory 20. The address of the word being accessed indicates its position in the line and the valid bits of the entries in the reconstituted line buffer indicate which DWs still need to be accessed. These DWs are accessed from the main memory in the default sequence. When the line buffer has been completely filled, its valid bit is set and it is stored into the cache memory.

Another improvement to the invention described is a modification of the RCT, making the instruction addresses set associative. If an N-bit hash function is used to address entries in the RCT, some of the data accesses may retrieve data for a different instruction, which happens to generate the same address in the hash table. As set forth above, when the hash operation is performed, the address field of the retrieved RCTE is compared to the (M-N) remaining bits of the instruction address which generated the currently processed cache miss. If these values are different, the entry is not for the addressed instruction and a new RCTE will overwrite the existing entry. During execution of a program which alternately executes the two instructions that have a common hash value, the RCTE may never be used. It may, instead, be continually replaced as the instruction loop is executed. This problem is called a buffer conflict.

A solution to the buffer conflict problem is make the RCT set associative. That is to say, to have two or more separate RCTEs for each possible address value returned by the hash function. If a reference for a target word finds an occupied but inappropriate RCTE at the address returned by the hash function, one of the multiple RCTEs having that address may be replaced with the appropriate entry for the instruction that accesses the new target word.

The use of multiple RCTEs per hash function address value introduces a new concern, RCTE replacement strategy. For example, if a reference is made to an instruction for which no RCTE exists, but the RCTEs for the hash function address value associated with the referencing instruction are both occupied, a decision would have to be made as to which RCTE should be replaced. A least recently used strategy is an effective means to resolve this problem. By this strategy, the least recently accessed RCTE would be overwritten by the new entry. The relative statuses of the RCTEs may be maintained by adding a status field to the RCTE and by using any of a number of aging functions that are known to those skilled in the art.

A meta-miss facility for a cache memory system has been described in which the order of the values being read into the cache is adjusted to improve processor performance. In addition, in certain well defined instances, values read in from main memory are accessed directly from a line buffer and are not stored into the cache memory.

While the invention has been described in terms of exemplary embodiments, it is contemplated that it may be practiced as outlined above with modifications within the spirit and scope of the appended claims.

The invention claimed is:

1. In a computer system including a processor, a cache memory with a line buffer and a main memory having a plurality of lines of data values, a method of responding to a memory access request, generated by he processor executing an instruction, for a data value not found in the cache memory wherein the requested data value resides in the main memory, the method comprising the steps of:
  (a) transferring elements of a selected one of said lines of data values including the requested data value, according to a first sequence determined by the order in which said elements are stored in the main memory, from the main memory to the line buffer in the cache memory in response to the memory access request;
  (b) monitoring the chronological order in which data values in said selected line are requested by the processor to define a second sequence; and
  (c) if said second sequence is different from said first sequence, transferring the elements of any requested line of data values, according to the second sequence, from the main memory to the line buffer in response to a subsequent execution of the same instruction.

2. The method set forth in claim 1 wherein:
the cache memory includes a storage element and the step (a) includes the steps of:
  transferring the elements of the requested line of data values to said line buffer according to said first sequence; and
  transferring the data values from said line buffer to said storage element; and
the step (b) includes the steps of:
  monitoring access requests for data values in said requested line of data values while the elements of said requested line of data values are being transferred to said line buffer;
  setting a wait state while continuing the data value transfer when said access requests are for data values that are not available in the line buffer at the time the data values are requested; and
the step (c) includes the step of transferring the elements of said requested line of data values from the main memory to the line buffer according to the second sequence only if the wait state was set.

3. The method set forth in claim 1 wherein:
the step (b) includes the steps of:
  identifying in a table which of said data values are requested by the processor while the requested line of data values is transferred from the main memory to the cache memory; and
  recording in said table a plurality of position indicators representing positions of the identified data values within said requested line as said second sequence.

4. The method set forth in claim 2 further comprising the steps of:
  (d) identifying in a table one instruction which initiates a request for data values in a second line of data values while a first line of data values is being transferred from said main memory to said cache memory in response to a prior execution of said one instruction; and
  (e) inhibiting the transfer of data values from said line buffer to said storage element in response to subsequent executions of said one instruction.

5. The method set forth in claim 1, wherein step (b) further comprises:
the step of storing, in a table, command entries for instructions that initiate requests for respective target data values not found in cache memory, each of said command entries containing said second sequence for the respective instruction, wherein said second sequence represents a preferred sequence which differs from said first sequence if said order in which said data values are requested in step (b) differs from said first sequence; and
step (c) further comprises:
the step of accessing the second sequence by way of the command entry which is stored in the table and which is associated with the instruction.

6. The method set forth in claim 5 in which the table of command entries containing said second sequences for transferring memory words from the main memory to the cache memory is set associative.

7. The method set forth in claim 1 including the further steps of:
  (d) detecting a second memory access request for a data value not found in the cache memory and not contained in the line currently being transferred from the main memory;
  (e) interrupting transfer of said current line from the main memory to the line buffer;
  (f) recording in a table a position indicator representing a relative position of a next data value in said current line;
  (g) responding to said second memory access request for data values not found in the cache memory according to steps (a), (b), and (c);
  (h) retrieving from said table said position indicator; and
  (i) completing the transfer of said current line from the main memory to the line buffer.

8. A computer implemented method of responding to multiple memory access requests during multiple executions of an instruction for a target data value not found in a cache memory with a line buffer wherein the requested data value resides in a main memory, comprising the steps of:

(a) transferring a line of data values, including the target data value from the main memory to the cache memory according to a first sequence determined by the order in which said elements are stored in the main memory in response to a first one of said multiple memory access requests for said target data value;

(b) monitoring under cache memory control data value requests received by said cache memory to determine a second sequence representing a chronological order in which a subset of the data values in said line are requested from said cache memory; and (c) transferring the subset of data values in the line to the line buffer according to the second sequence, and then transferring the remaining data values in the line in the order in which said remaining values are included in said first sequence, in response to a subsequent one of said multiple requests for the target data value during subsequent executions of said instruction.

9. In a computer system including a processor, a main memory, having multiple lines of data values, and a cache memory, having a line buffer, a method for responding to a plurality of memory access requests for data values in respectively different lines of data values in main memory, wherein said plurality of memory access requests are generated in response to one instruction being executed by said processor at a respective plurality of instances, said method comprising the steps of:

(a) transferring the data values in one of said plurality of lines from said main memory to the line buffer of said cache memory, responsive to a respective execution of said one instruction;

(b) setting an indicator if a further execution of said one instruction, accessing a data value in a further one of said plurality of lines, is detected during the transfer of data values in said one line from said main memory to said line buffer;

(c) inhibiting any transfer of data from said line buffer to said cache memory in response to said indicator being set.

10. In a computer system including a processor, a main memory, having multiple lines of data values and a cache memory having a line buffer, a method of responding to a memory access request, initiated by a first instruction executing on said processor, for a target data value not found in a cache memory wherein the target data value resides in a main memory, said method comprising the steps of:

(a) transferring the target data value from the main memory to the line buffer in response to the memory access request;

(b) examining a second instruction, which follows the first instruction, to determine if the second instruction may cause the processor to make a memory access request for a data value in the same line as said target data value, in order to find a next data value in said line to transfer from said main memory to said line buffer; and (c) if any next data value is found in said line in step (b), transferring said next data value from the main memory to the line buffer as the next data value after the target data value.

11. A computer implemented method of responding to memory access requests from multiple executions of an instruction for data values in main memory, which data values are not found in a cache memory, comprising the steps of:

(a) transferring a line of data value according to a first sequence determined by the order in which said elements are stored in the main memory, from the main memory to a line buffer within the cache memory in response to a first one of the memory access requests;

(b) monitoring said memory access requests to determine which data values in said line are requested; and (c) defining a second sequence in which the data values from any one line are transferred from the main memory to the line buffer for subsequent memory access requests by said instruction so that the data values in said one line which are requested by said memory access requests are transferred before the data values in said one line which are not so requested.

12. In a computer system including a processor, a cache memory with a line buffer and a main memory having a plurality of lines of data values, apparatus for responding to a memory access request, generated by the processor executing an instruction, for a data value not found in the cache memory wherein the requested data value resides in the main memory, the apparatus comprising:

means for transferring elements of a selected one of said lines of data values including the requested data value, according to a first sequence determined by the order in which said elements are stored in the main memory, from the main memory to the line buffer of the cache memory in response to the memory access request;

means responsive to said memory access requests for monitoring the order in which data values in said selected line are requested by the processor to define a second sequence; and means responsive to said monitoring means for transferring the elements of any requested line of data values, according to the second sequence, from the main memory to the line buffer in response to a subsequent execution of the same instruction.

13. In a computer system including a processor, a main memory, having multiple lines of data values, and a cache memory, having a line buffer, apparatus for responding to a plurality of memory access requests for data values in respectively different lines of data values in main memory, wherein said plurality of memory access requests are generated in response to one instruction being executed by said processor at a respective plurality of instances, said apparatus comprising:

means for transferring the data values in one of said plurality of lines from said main memory to the line buffer of said cache memory, responsive to a respective execution of said one instruction;

means for setting an indicator if a further execution of said one instruction, accessing a data value in a further one of said plurality of lines, is detected during the transfer of data values in said one line from said main memory to said line buffer;

means for inhibiting any transfer of data from said line buffer to said cache memory in response to said indicator being set.

* * * * *